Figure 1:
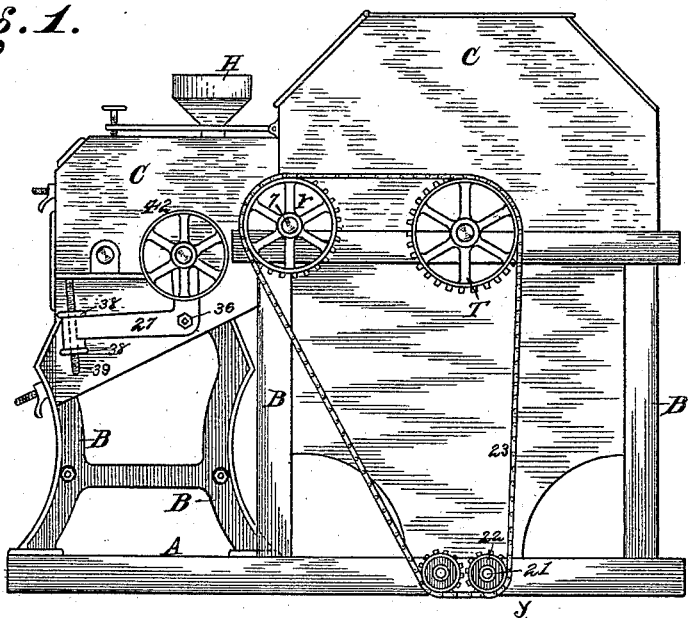

(No Model.) 5 Sheets—Sheet 1.

J. H. WOOLCOTT.
ROLLER REDUCTION MILL.

No. 395,534. Patented Jan. 1, 1889.

Attest:
J. Watson Sims
M. C. Milliken

Inventor
John H. Woolcott
by Wood & Boyd
his Attorneys &c.

(No Model.) 5 Sheets—Sheet 2.
J. H. WOOLCOTT.
ROLLER REDUCTION MILL.
No. 395,534. Patented Jan. 1, 1889.
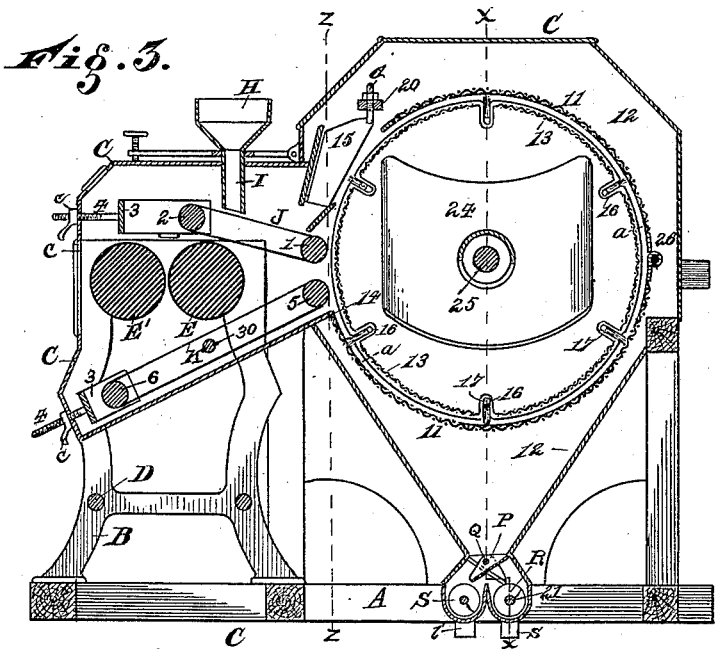
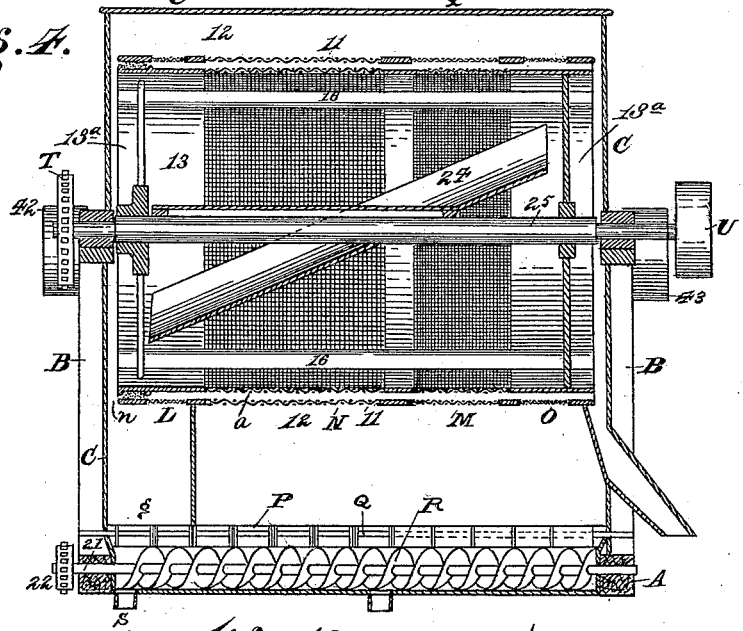
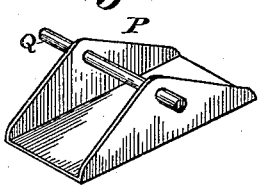
Attest.
J. Watson Sims.
M. E. Millikan
Inventor
John H. Woolcott
by Wood & Boyd
his Attorneys &c.

(No Model.) 5 Sheets—Sheet 3.

J. H. WOOLCOTT.
ROLLER REDUCTION MILL.

No. 395,534. Patented Jan. 1, 1889.

Attest
J. Watson Sims
M. E. Milliken

Inventor
John H. Woolcott
by Wood & Boyd
his Attorneys &c.

(No Model.) 5 Sheets—Sheet 4.

J. H. WOOLCOTT.
ROLLER REDUCTION MILL.

No. 395,534. Patented Jan. 1, 1889.

Attest
J. Watson Sims
M. E. Millikan

Inventor
John H. Woolcott
by Wood & Boyd
his Attorneys (No Model.)

J. H. WOOLCOTT.
ROLLER REDUCTION MILL.

No. 395,534. Patented Jan. 1, 1889.

Witnesses.
J Watson Sime
M E Millikan

Inventors.
John H Woolcott
By Wood & Boyd.
Attys

UNITED STATES PATENT OFFICE.

JOHN H. WOOLCOTT, OF CINCINNATI, OHIO.

ROLLER REDUCTION-MILL.

SPECIFICATION forming part of Letters Patent No. 395,534, dated January 1, 1889.

Application filed January 31, 1887. Serial No. 226,071. (No model.)

*To all whom it may concern:*

Be it known that I, JOHN H. WOOLCOTT, a resident of Cincinnati, in the county of Hamilton and State of Ohio, have invented certain new and useful Improvements in Roller Reduction-Mills, of which the following is a specification.

My invention relates to a gradual-reduction mill.
One of the objects of my invention is to provide an improved combination of a roller-mill with a reel, whereby the reel may perform the double office of scalping the reduced product and at the same time assist in elevating the product and carrying it back to the same or a different set of rolls for a further reduction.

Another object of my invention is to provide an improved construction of the reducing-rolls, whereby a single set may be used as a gradual-reduction set, and this is obtained by adjusting their peripheries at an angle, instead of parallel to each other.

Another object of my invention is to combine on one and the same machine one or more gradual-reduction rollers with a reel and circular screen of different fineness of mesh, with appropriate spouts, so that the grades as they are progressively reduced may be carried out of the mill, and the coarser material carried back for further reduction, until they have been properly reduced.

Another object of my invention is to provide a novel construction of the separating-cloths of the reel and screen in connection with the spouts, that the middlings may be properly separated and carried off for further reduction as fast as they have been reduced to the right degree of fineness.
Another object of my invention is to provide new and improved means to take off the flour obtained by each successive break as fast as it is reduced to sufficient fineness for separation and purification, so as to prevent it from being carried back with the coarse middlings for further reduction.

The various features of my invention will be fully explained in the description of the accompanying drawings, making a part of this specification, in which—

Figure 2:
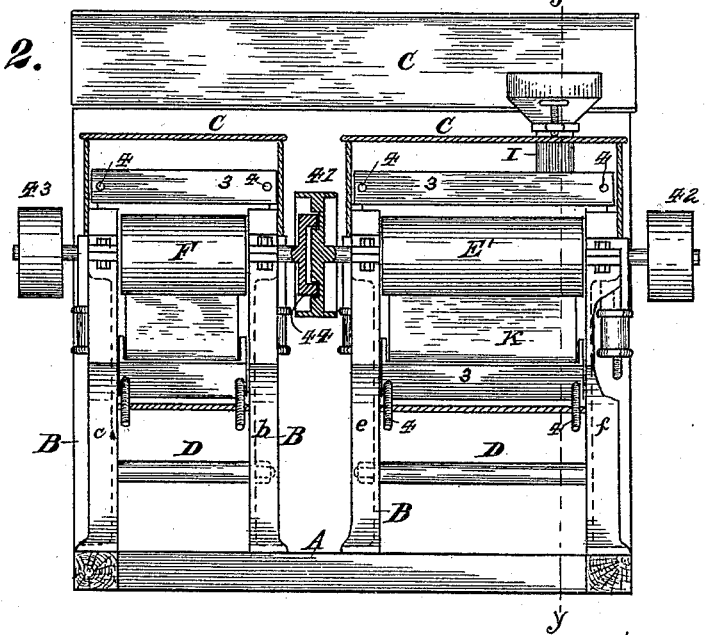
Figure 5:
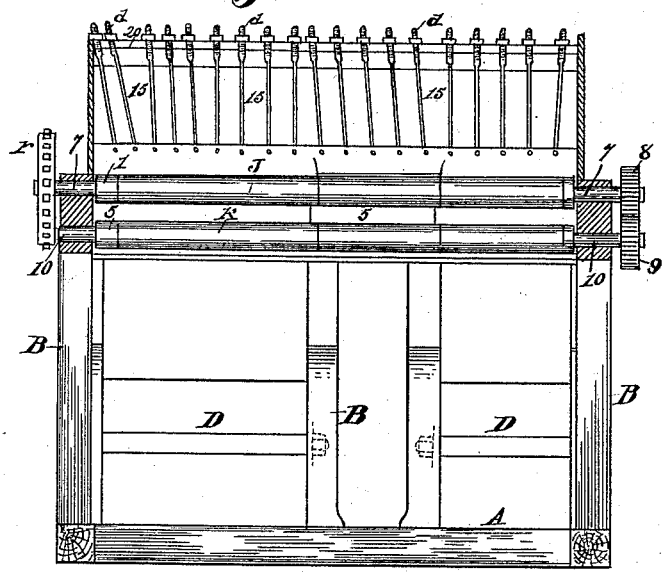
Figure 11:
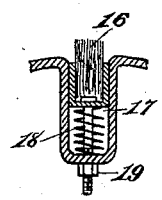
Figure 12:
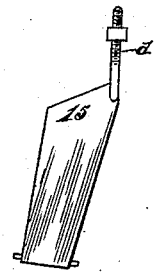
Figure 13:
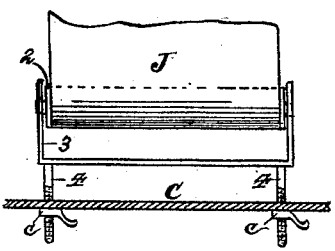
Figure 6:
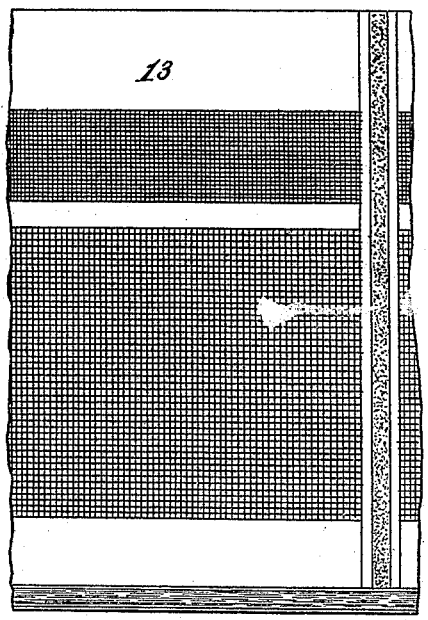
Figure 7:
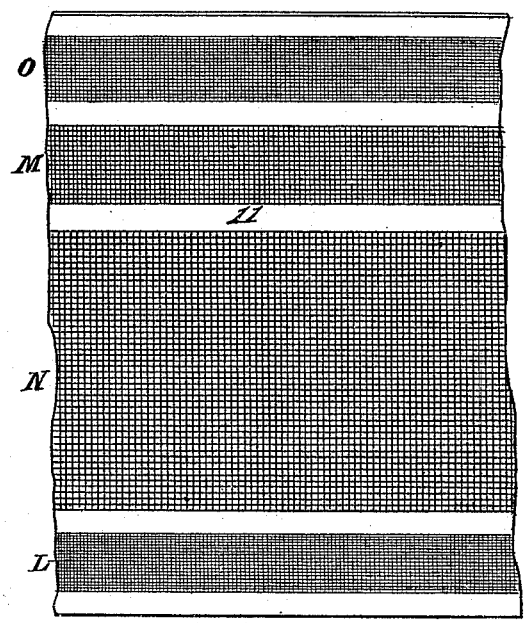
Figure 8:
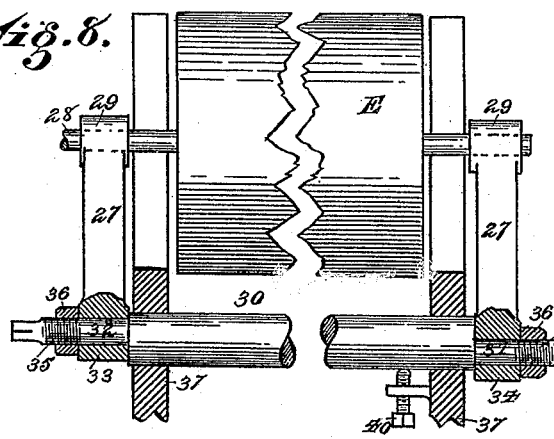
Figure 9:
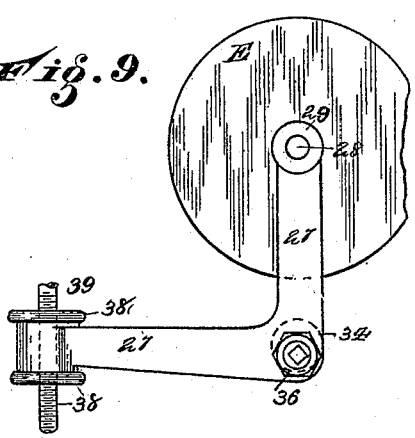
Figure 14:
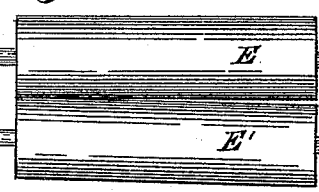
Figure 15:
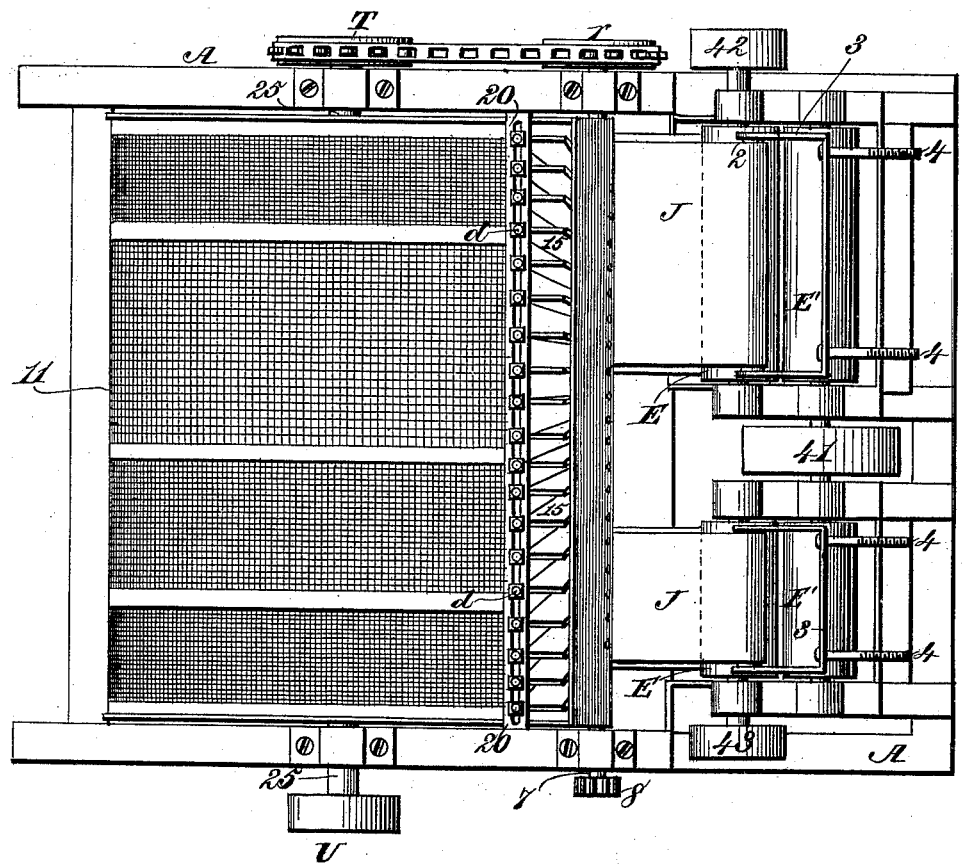

Figure 1 is an end elevation of my improved mill. Fig. 2 is a side elevation of the same with the casing removed. Fig. 3 is a cross-section on line *y y*, Fig. 2. Fig. 4 is a longitudinal vertical section on line *x x*, Fig. 3, with the reel in section between the brushes. Fig. 5 is a section on line *z z*, Fig. 3. Fig. 6 is a plan view of the reel-cloth. Fig. 7 is a plan view of the screen-casing surrounding the reel. Fig. 8 is a detail view of the roller-adjusting mechanism. Fig. 9 is a side elevation of the same. Fig. 10 is a perspective view of one of the cut-offs. Fig. 11 is a sectional view of the adjusting devices of the reel-elevator brush. Fig. 12 is an elevation of one of the adjustable guides. Fig. 13 is a plan view of the apron-frame. Fig. 14 is a plan view of the rolls, showing the manner of effecting a graduated reduction thereby. Fig. 15 is a plan view of the entire machine.

A represents the sill of the machine; B, the side posts; D, the tie-rods and sleeves connecting the metal frames B of the rolls; C, the shell or covering of the frame. These parts may be made of metal or wood, and the covering is preferably made detachable, so as to afford access to the interior of the mill. The preferred form of constructing the mill is to provide two sets of reducing-rolls; but the mode of operation hereinafter described may be employed with one set of rolls.

E E', Fig. 14, represent a pair of reducing-rolls having their axes inclined or converging at one end, so that the space between the rolls gradually increases toward one end.

F represents a second set of rolls, which are placed at the opposite end of the machine, and these are preferably arranged so that their axes are parallel for the last reduction.

H represents a hopper, into which the wheat or grain is fed for the first reduction.

I represents the spout leading from the hopper to the apron J, which apron is supported by the driving-rollers 1 and idlers 2 and delivers the meal to the rolls.

K represents another apron supported below the rolls E E' on rollers 5 and 6, and which receives the reduced material from the rolls. The rollers 5 and 6 are each supported in a frame, 3, which is provided with adjusting-rods 4, projecting through the shell of the frame C, and having thumb-nuts *c*, for moving them and the frames 3 longitudinally to tighten or loosen the aprons J and K. These rolls are driven as follows:

*r* represents a driving-pulley keyed upon the shaft 7, which shaft passes transversely through the frame and is journaled therein and carries the belt-rollers 1. 8 represents a spur-gear mounted upon the opposite end of the shaft 7.

9 represents a transmitter meshing with the spur 8 and keyed upon shaft 10, which passes transversely through the frame supporting the apron-rollers 5, around which the apron K passes.

The apron J not only carries the grain from the spout I to the reducing-rolls, but also carries the coarse middlings from the reel back to the reducing-rolls for further reduction.

11 represents a nearly-cylindrical screen placed in the reel-chamber 12 and surrounding the reel 13. This screen 11 terminates at the point 14 below the apron K (see Fig. 3) and opposite the guides 15 on the upper side. This opening is to allow free delivery from the apron K to the reel and screen and from the reel-conveyer between the guides 15 back upon apron J.

The screen 11, though described above as being nearly cylindrical, might properly be called a "concave" screen. Within said screen 11 revolves the cylindrical reel 13, concentric with screen 11, but separated therefrom by a narrow annular space, a, Figs. 3 and 4, said space being sufficient to permit the passage of the material therein without heating or breaking. The cylindrical reel 13 is provided with a continuous or imperforate cylindrical surface, 13ª, at each end to keep the material on the external concave screen, 11, and carry it over to deflectors 15. The reduced material passes into the space a from apron K, and is carried forward by the revolution of reel 13, which is mounted on shaft 25. To facilitate this operation, the reel is provided with brushes 16, Figs. 3, 4, and 11. These conveyers are preferably made adjustable within the recesses 17, formed in the periphery of the reel, as shown by the enlarged view, Fig. 11, and are supported on adjusting-springs 18, with nuts and bolts 19, for regulating the degree of projection of the brushes or conveyers. These are preferably made of wool, cotton, or other soft fibrous material.

The screen 11 is preferably formed of four different degrees or grades of fineness of mesh of wire or silk bolting-cloth, as illustrated in Fig. 7, L representing a very fine mesh or grade of said bolting-cloth directly opposite spout I, extending circumferentially around the reel. (See Fig. 4.) This fine grade of cloth is to remove the seam dirt, which passes through that portion of the screen L, drops down onto the spout g vertically under it, thence is carried off by the conveyer to and out of spout s at the bottom of the machine. N represents the next grade of cloth, which is preferably coarse enough to carry through all the coarse flour made by the respective breaks—say about eighteen meshes to the linear inch—but not coarse enough to let through such middlings and bran as require further reduction, which coarser material or product is carried around by the brushes 16 of the reel until it reaches the guides 15, between which it is carried and dropped out of the apron J. These guides 15 are shown in elevation in Fig. 5, and they are constructed so as to be inclined more or less, as may be desired. This is accomplished by hinging the guides 15 at the lower end and having the upper end provided with the shank d, passing through a slotted plate, 20, and provided with adjusting-screws or thumb-nuts for securing them in any desired adjustment. Thus if it is desired to carry the material rapidly across the mill, so as to reduce rapidly and prevent carrying the material around from the reduction-rolls to the screen and reel and back again too many times, the guides 15 are set quite inclined. If it is desired to make the reduction more gradual, these guides are set more nearly vertical. The centrifugal force of the reel forces the material between these guides 15 and it is dropped onto the apron J. (See Fig. 3.) M represents a still finer mesh or grade of cloth, and O a progressively finer. These different grades of cloth may be variously modified according as the mill is required to reduce fast or slow—that is, make a greater or less number of reductions. The material passing through these screens is forced into the series of spouts P, hung on the shaft Q vertically over the conveyer R on shaft 21, which is driven by pulley 22 and the band or sprocket chain 23, which likewise drives the other parts of the mill. Parallel with and in front of the conveyer R is another conveyer, S. It is also under one end of the series of spouts P. When these spouts are adjusted, as shown in full lines Fig. 3, they are delivering material to the conveyer S, which delivers the same out of the spout i. There may be as many of these spouts placed to discharge into the conveyer S or into the conveyer R as desired to grade the product delivered thereby. Thus the spouts P may be adjusted in their relation to the respective meshes of the screen, so as to deliver the break flour or middlings to either of the conveyers R or S, as may be desired. The spout 24 is swiveled onto the shaft 25 of the reel, so as to receive the middlings separated by the reel and convey it out at the point n down onto one or more spouts, P, vertically beneath, as shown in Fig. 3. Thus it will be seen that a part of the separation is taken out by the screen 13 and brought down into the spouts, and a part of the separation passes into the reel and is conveyed out thence by the spout 24, while the material not sufficiently reduced is carried back by the brushes 16 of the reel and delivered onto the apron J and conveyed back to the rolls for further reduction.

The construction of the aprons and method of reduction of the second or any additional number of rolls are the same as that described for the first set; but I prefer to have the axes of the second set of rolls parallel to each other to make the last reduction uniform.

26 represents a hinge or joint to allow the upper section of the screen 11 to be detached from the lower, so that the reel may be inserted or removed from the chamber at will, the covering C being previously removed.

In order to adjust the reduction-rolls both vertically and horizontally to any desired degree, I have provided the following instrumentalities, as shown in Figs. 8 and 9:

27 represents L-shaped arms upon each end of the respective sets of rolls, and in which one of said rolls is journaled in the following manner: 28 represents the shaft of one of the rolls journaling in the bearing 29 at one end of said L-shaped arms. These arms are each pivoted at their angles on eccentrics 31 and 32 on the ends of a shaft, 30.

35 represents screw-threads and 36 jam-nuts on the ends of the eccentric-shaft 30. The shaft 30 is journaled in the frame-pieces 37, and eccentrics 31 and 32 are placed opposite to each other, so that when the shaft 30 is turned the arms 27 will be raised and lowered simultaneously at both ends and in a corresponding degree, thereby elevating or depressing the shafts 28 of the roller E.

In order to adjust the rolls to or from each other in any desired manner, the forward end of the arm 27 is sustained by a screw-rod, 39, which taps through the nuts 38. As the nuts, therefore, are turned up or down, the arm 27 is swung over the axes in the elbow of arm 27, and the axes 28 of roller E are moved in a horizontal direction to or from the axes of the other roller.

40 represents a set-screw tapping against the shaft or axis 30 of the adjusting-rod for holding it in any desired fixed position. The two sets of rolls shown by the front view, Fig. 2, are each shown supported on separate posts b c e f.

I have shown a single driving-pulley, 41, for the front rolls, E F, which is driven in any desired manner, but at a different speed from the pulleys 42 43, which drive, say, the faster-speeded rolls. In order that rolls E F may be separately adjusted, I couple the shaft of roller F to pulley 41 by a clutch, 44.

U represents a pulley for driving the reel. T represents a transmitter on the opposite end for driving the conveyer-shafts and the apron-rollers by means of pulley 6 and the transmitter-shafts 7 and 10. (Shown in Fig. 5.)

The employment of separating-cloth in the reel 13 is an addition to the separation made by the screen 11, and its employment is for the purpose of reducing the size of the nearly-cylindrical screen and reel. It is obvious that the separation could be made by either one alone, provided the separating-cloth is of sufficient area to perform the work. I do not, therefore, limit myself to the use of cloth or screens on both of these devices in claims where both separators are not named as elements.

Having described my invention, what I claim as new is—

1. In a gradual-reduction mill, the combination of one or more sets of reducing-rolls with conveying-aprons J and K, one above and the other below the said reducing-rolls, and an elevating-reel and concave separating-screen, substantially as herein specified.

2. In combination with one or more sets of reducing-rolls, an elevating-reel, the outside separating concave screen, 11, and adjustable guides 15, with conveying-aprons J K, substantially as herein specified.

3. The combination of the concave screen 11, the reel 13, having recesses 17, and the radially-adjustable spring-actuated brushes 16, arranged in said recesses, the reel 13 being arranged concentrically within the concave screen 11, with an annular space, $a$, between, substantially as described.

4. In combination with the reducing-rolls and the conveying-aprons above and beneath said rolls, the elevating-reel having recesses 17, the spring-pressed brushes 16, radially adjustable in said recesses, the concave screen, and the adjustable guides 15, arranged adjacent to the opening in said screen, substantially as described.

5. In combination with one or more sets of reducing-rolls and conveying-aprons, the concave screen 11, an elevating-reel, 13, and a series of adjustable guides, 15, arranged above the apron lying over the reducing-rolls, substantially as described.

6. In combination with the conveying-aprons J and K, the reducing-rolls E E', arranged between said aprons and having their axes inclined to each other, the concave screen 11, and the elevating-reel revolving therein, substantially as described.

7. The combination, with the elevating-reel having recesses 17, of the brushes 16, having threaded shanks, the springs 18, nuts 19, and the concave screen 11, substantially as described.

8. A middlings-separator composed, substantially, of the revolving elevating-reel and brushes, a concave screen provided with an opening on one side, a conveying-apron delivering the product through said opening, another conveying-apron taking the tailings from the reel and delivering them to the reduction-rolls, and reduction-rolls arranged between said conveying-aprons, substantially as described.

9. The combination, with the roll E', journaled in fixed bearings, of the pressure-roller E, the L-shaped arms 27, the eccentric shaft 30, journaled in the knees of said arms, and the locking devices 36, for holding said shaft 30 in a fixed adjustment, substantially as described.

In testimony whereof I have hereunto set my hand.

JOHN H. WOOLCOTT.

Witnesses:
ROBERT ZAHNER,
M. E. MILLIKAN.